July 14, 1925.
G. E. FRIEDLEY
VEHICLE SIGNAL
Filed April 19, 1923
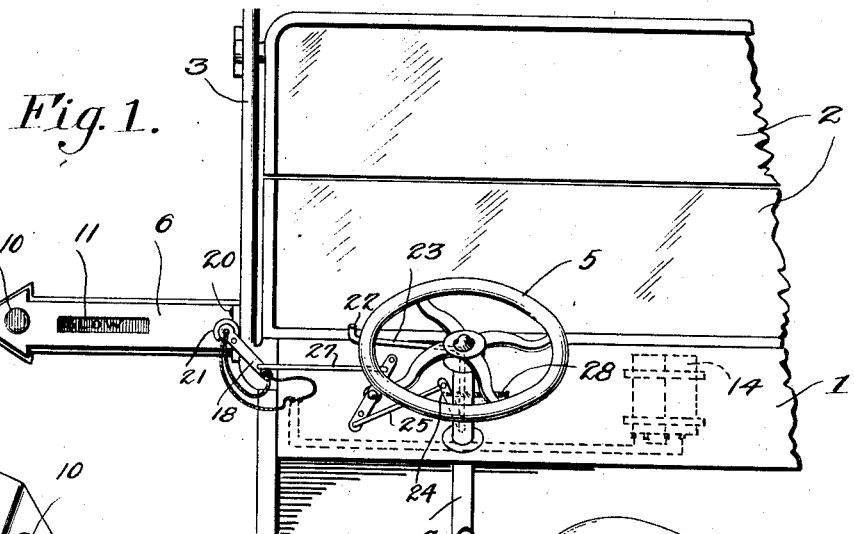
Fig. 1.
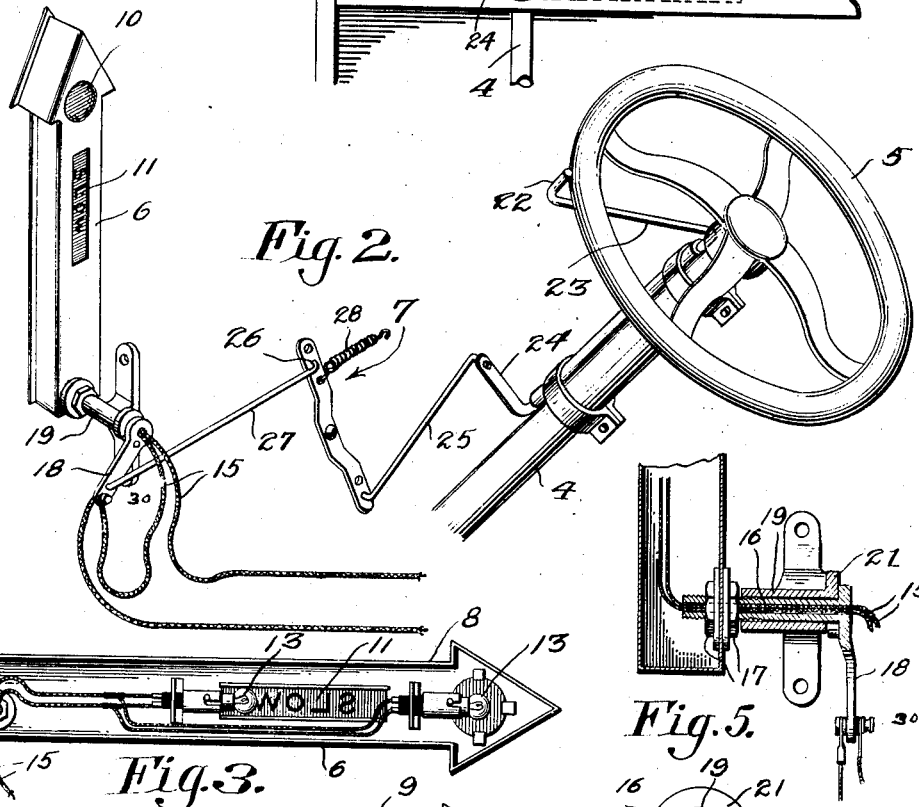
Fig. 2.
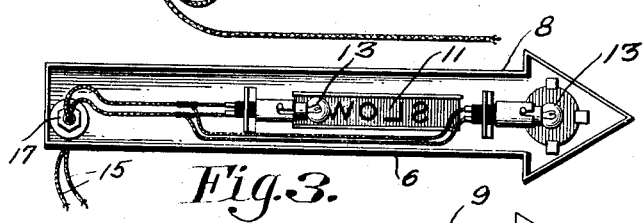
Fig. 3.
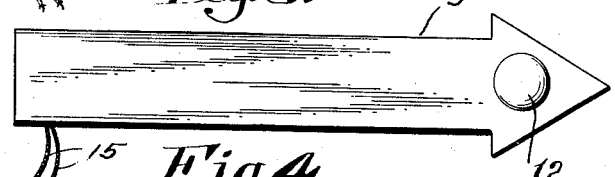
Fig. 4.
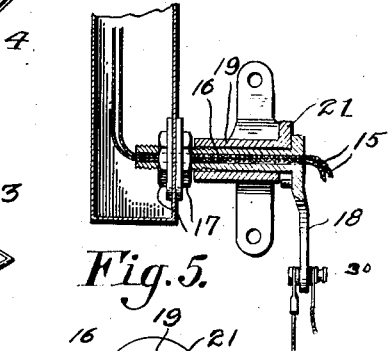
Fig. 5.
Fig. 6.
Inventor.
George E. Friedley.
By William L. Symons
his Attorney Patented July 14, 1925.

1,545,825

UNITED STATES PATENT OFFICE.

GEORGE EDWARD FRIEDLEY, OF HELENA, ARKANSAS.

VEHICLE SIGNAL.

Application filed April 19, 1923. Serial No. 633,275.

*To all whom it may concern:*

Be it known that I, GEORGE E. FRIEDLEY, a citizen of the United States of America, residing at Helena, in the county of Phillips and State of Arkansas, have invented certain new and useful Improvements in Vehicle Signals, of which the following is a specification.

My invention relates to vehicle signals and is applicable particularly to signals to be used on automobiles.

An object of my invention is the construction of a signal to be applied to the front part of an automobile and which may be readily and easily operated by the driver to indicate to drivers in the rear that a change in speed is necessary or that a stop may be required. A further object is to place the signal so that when not in operation it will not be in the way. Another object is to construct the signal in such a manner that when it is operated it may readily and effectively serve its purpose. A still further object is the production of a device which is cheap to manufacture and which will not easily get out of order. A still further object is to place the mechanically operated means in an advantageous and easily reached position. A still further object is to use means which positively limits the movement of the signal in an operative and an inoperative position.

With these and other objects in view, one embodiment of my invention is illustrated in the accompanying drawings in which:

Figure 1 is a front elevation of the device shown as it may be attached to the front of an automobile;

Figure 2 is a perspective of the device unattached;

Figure 3 is a top plan of the arrow of the signal with the top thereof removed;

Figure 4 is a top plan view of the cover of the arrow;

Figure 5 is a fragmentary sectional view showing the connection between the arrow and the operating rods; and Figure 6 is a side elevation of the operating crank with some of the connections removed.

A part of the conventional dash board 1 of an automobile, the wind shield 2, one support thereof 3, the steering rod 4, and wheel 5 are shown in the drawings.

My invention consists generally of an arrow-shaped indicator 6 and means 7 for operating the indicator. The arrow is made from any suitable material such as sheet metal and comprises a rear piece 8 and a front piece 9. The part 8 is box shaped with flanges on the sides which fit into corresponding grooves in the top 9. There is an opening 10 in the end of the part 8 in which may be placed a piece of red transparent material such as glass. A second opening 11 is also made in the part 8 in which may be placed a piece of red transparent material such as glass, having on it such notice as "Slow". In the top 9 of the arrow is an opening 12 in which may be placed a piece of white or uncolored material such as glass. It will be obvious from the drawings that the glass 12, when the indicator is in use, will be on the side of the arrow looking to the front. The arrow may be lighted by any suitable means, as by electric lights 13 connected to any suitable source of current as by batteries 14 by means of wires 15.

The manner of operating the arrow indicator will now be described. The arrow 6 is attached to a shaft 16 in any suitable way as by nuts and washers 17 having a crank 18 on the end thereof. This shaft is journaled in bearings 19 which may be attached to a support 3 in any suitable manner as by bolts or screws 20. The end 21 of the bearing 19 is cut away as is clearly indicated in Figure 6 to enable a pin 18ª on the crank 18 to swing a certain determined distance, and then to be stopped; in other words, the arrow may swing to a horizontal position and no further, and may swing to a vertical position and no further. When the crank is in the position shown in Figure 6, the arrow will be raised to inoperative position as shown in Figure 2, and when it is swung down it will strike the other end of the bearing. The movement of the arrow is controlled by a finger piece 22, the end of which is placed in a position easily reached by the hand of the operator while remaining on the wheel. The rod 23 of which the piece 22 is the end is swiveled to the steering post and has the right angled end 24 thereof attached to a connecting rod 25 which connects with an arm 26 pivoted to the dash board. To this pivoted arm is attached another connecting arm 27 joined to the crank 18.

A spring 28 tends to hold the arrow in vertical position when raised to that position by the operator.

The manner of using my device will be perfectly clear from the above description. If the driver wishes to indicate to those in the rear that he must slow up or stop, he uses his finger or any other part of his hand to throw the finger piece down, resulting in the arrow dropping to a horizontal position. As the arrow is moved to a horizontal position, the connecting rod 27 comes in contact with the nut 30, which closes the circuit, turning on the lights 13. As the nut 30 and the wire which it clamps are insulated from the crank 18, when the rod 27 is removed from contact with the nut the circuit will be broken. When there is no further need for the signal to remain in operation, he merely reverses the movement and places it in a vertical position.

Having described my invention, what I claim and desire to protect by Letters Patent is:

1. A device of the kind described comprising a movable indicator, a shaft attached to said indicator, a crank attached to the end of said shaft, a bearing for said shaft, said bearing having one end thereof partly cut away to provide abutments, an abutting member on said crank adapted to travel between said abutments whereby the movement of the indicator is positively defined, means attached to said crank to move the indicator to operative and to inoperative position and spring means urging said indicator towards its inoperative position.

2. A device of the kind described comprising a movable indicator, said indicator having lights therein, and openings therein rendering said lights visible when lighted, a source of current to light said lights, said source being connected with said lights when the indicator is in operative position and disconnected from said lights when the indicator is in inoperative position, a shaft attached to said indicator, a crank attached to the end of said shaft, a bearing for said shaft, said bearing having one end thereof partly cut away to provide abutments, an abutting member on said crank adapted to travel between said abutments whereby the movement of the indicator is positively defined, means attached to said crank to move the indicator to operative and to inoperative position and spring means, urging said indicator towards its inoperative position.

In testimony whereof I affix my signature.

GEORGE EDWARD FRIEDLEY.